United States Patent
Al-Harbi et al.

(10) Patent No.: US 10,066,156 B2
(45) Date of Patent: Sep. 4, 2018

(54) SUPERCRITICAL CARBON DIOXIDE EMULSIFIED ACID

(71) Applicant: Saudi Arabian Oil Company, Dhahran (SA)

(72) Inventors: Bader Ghazi Al-Harbi, Dammam (SA); Fawaz M. Al-Otaibi, Dhahran (SA); Mohammed H. Al-Khaldi, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 437 days.

(21) Appl. No.: 14/686,386

(22) Filed: Apr. 14, 2015

(65) Prior Publication Data
US 2016/0304772 A1 Oct. 20, 2016

(51) Int. Cl.
*E21B 43/22* (2006.01)
*E21B 37/06* (2006.01)
(Continued)

(52) U.S. Cl.
CPC .............. *C09K 8/845* (2013.01); *B01F 17/00* (2013.01); *C09K 8/70* (2013.01); *C09K 8/74* (2013.01); *C09K 8/92* (2013.01); *E21B 43/164* (2013.01); *E21B 43/24* (2013.01); *E21B 49/00* (2013.01); *C09K 8/52* (2013.01); *C09K 8/594* (2013.01); *C09K 2208/10* (2013.01); *C09K 2208/32* (2013.01); *Y02P 20/544* (2015.11)

(58) Field of Classification Search
CPC .... C09K 2208/10; C09K 8/524; C09K 8/805; C09K 8/588; C09K 8/70; C09K 8/74; E21B 37/06; E21B 43/25; E21B 43/26; E21B 49/00; E21B 43/16
See application file for complete search history.

(56) References Cited

U.S. PATENT DOCUMENTS 5,358,046 A 10/1994 Sydansk et al.
5,990,052 A 11/1999 Harris
(Continued)

FOREIGN PATENT DOCUMENTS

WO WO2008070035 A2 6/2008

OTHER PUBLICATIONS

International Search Report and Written Opinion of the International Searching Authority issued in International Application No. PCT/US2015/055649 dated Jan. 29, 2016; 13 pages.
(Continued)

*Primary Examiner* — Zakiya W Bates
(74) *Attorney, Agent, or Firm* — Fish & Richardson P.C.

(57) ABSTRACT

One aspect of an emulsion includes an internal phase including acid, an external phase including supercritical carbon dioxide, and multiple nanoparticles to stabilize the internal phase and the external phase. The acid can include hydrochloric acid. The hydrochloric acid can include 15% hydrochloric acid. The nanoparticles can include hydrophobic nanoparticles. A concentration of nanoparticles in the emulsion can be at least 0.1% by weight. The emulsion can include a corrosion inhibitor. A concentration of the corrosion inhibitor can be in a range of between 0.25% and 0.6% by volume. A ratio of a concentration of the acid to a concentration of the supercritical carbon dioxide can be in a range between 30% and 70%.

18 Claims, 4 Drawing Sheets

(51) Int. Cl.
*C09K 8/84* (2006.01)
*B01F 17/00* (2006.01)
*C09K 8/70* (2006.01)
*C09K 8/74* (2006.01)
*C09K 8/92* (2006.01)
*E21B 43/16* (2006.01)
*E21B 43/24* (2006.01)
*E21B 49/00* (2006.01)
*C09K 8/52* (2006.01)
*C09K 8/594* (2006.01)

(56) References Cited

U.S. PATENT DOCUMENTS

| | | | |
|---|---|---|---|
| 7,053,131 B2 | 5/2006 | Ko et al. | |
| 7,779,913 B2 | 8/2010 | Dahanayake et al. | |
| 7,878,248 B2 | 2/2011 | Abad et al. | |
| 8,006,760 B2 * | 8/2011 | Fleming | C09K 8/685 166/280.2 |
| 8,039,422 B1 | 10/2011 | Al-Zahrani | |
| 8,124,824 B2 | 2/2012 | Hirl | |
| 2008/0260852 A1 * | 10/2008 | Chattopadhyay | A61K 9/1647 424/501 |
| 2011/0224109 A1 | 9/2011 | Ali et al. | |
| 2013/0240046 A9 | 9/2013 | Cloeter et al. | |

OTHER PUBLICATIONS

Golomb D. et al.; "Macroemulsions of Liquid and Superficial $CO_2$-in-Water and Water-in-Liquid $CO_2$ Stabilized by Fine Particles"; Industrial & Engineering Chemistry Research; vol. 45, No. 8; Apr. 1, 2006; 6 pages.

Kongsombut, B. et al.; "Encapsulation of $SiO_2$ and $TiO_2$ Fine Powders with Poly(DL-lactic-co-glycolic acid) by Rapid Expansion of Supercritical $CO_2$ Incorporated with Ethanol Cosolvent"; Industrial & Engineering Chemistry Research; vol. 48, No. 24; Dec. 16, 2009; 6 pages.

* cited by examiner

SUPERCRITICAL CARBON DIOXIDE EMULSIFIED ACID

TECHNICAL FIELD

This disclosure relates to stimulation of subterranean formations with an acid emulsion.

BACKGROUND

During some well stimulation procedures such as fracturing, an acid is introduced into the wellbore. In order to achieve deep acid penetration, an acid emulsion can be used to retard the reaction rate between the acid and the formation. For example, in an acid-in-diesel emulsion, the retardation of the reaction is due to the diesel external phase which acts as a barrier minimizing the acid transfer to the rock surface. However, at elevated temperatures (i.e., 300° F. and above), the acid-in-diesel emulsion becomes unstable, and thus the retardation mechanism is lost.

SUMMARY

This disclosure describes a supercritical carbon dioxide emulsified acid.

In some aspects, an emulsion includes an internal phase including acid, an external phase including supercritical carbon dioxide, and multiple nanoparticles to stabilize the internal phase and the external phase.

This, and other aspects, can include one or more of the following features. The acid can include hydrochloric acid. The hydrochloric acid can include 15% hydrochloric acid. The nanoparticles can include hydrophobic nanoparticles. A concentration of nanoparticles in the emulsion can be at least 0.1% by weight. The emulsion can include a corrosion inhibitor. A concentration of the corrosion inhibitor can be in a range of between 0.25% and 0.6% by volume. A ratio of a concentration of the acid to a concentration of the supercritical carbon dioxide can be in a range between 30% and 70%.

In some aspects, a method of manufacturing an emulsion includes mixing a first quantity of nanoparticles and a second quantity of carbon dioxide. The method also includes mixing a third quantity of acid with the mixture of the first quantity and the second quantity at a temperature and a pressure sufficient to convert the carbon dioxide into supercritical carbon dioxide.

This, and other aspects, can include one or more of the following features. The method can include mixing a fourth quantity of corrosion inhibitors with the first quantity, the second quantity, and the third quantity. Mixing the third quantity of the acid to the mixture of the first quantity and the second quantity can include mixing the third quantity at a drop-wise rate. Mixing the first quantity, the second quantity, and the third quantity can include mixing the first quantity, the second quantity, and the third quantity for a duration between about ten minutes and about fifteen minutes. The temperature can be at least 40 C and the pressure can be at least 1100 psi. The method can include measuring an emulsion height in response to mixing the third quantity with the mixture of the first quantity and the second quantity and determining a stability of the emulsion based, in part, on the measured emulsion height. Determining the stability of the emulsion based, in part, on the measured emulsion height can include comparing the measured emulsion height with a total emulsion height. The method can include pressurizing the second quantity of carbon dioxide before mixing the first quantity and the second quantity. Pressurizing the second quantity of carbon dioxide can include pressurizing the second quantity of carbon dioxide to at least 1500 psi. The acid can include hydrochloric acid and the nanoparticles can include hydrophobic nanoparticles.

In some aspects, a method for controlling formation stimulation includes identifying a rate of acid retardation in a formation, determining a quantity of supercritical carbon dioxide to be included in a stimulant to obtain the identified rate of acid retardation in the formation; and manufacturing an emulsion. The emulsion includes an internal phase including a first quantity of acid, an external phase including the determined quantity of supercritical carbon dioxide, and a second quantity of multiple nanoparticles to stabilize the internal phase and the external phase.

This, and other aspects, can include the following feature. The method can include flowing the emulsion into the formation.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
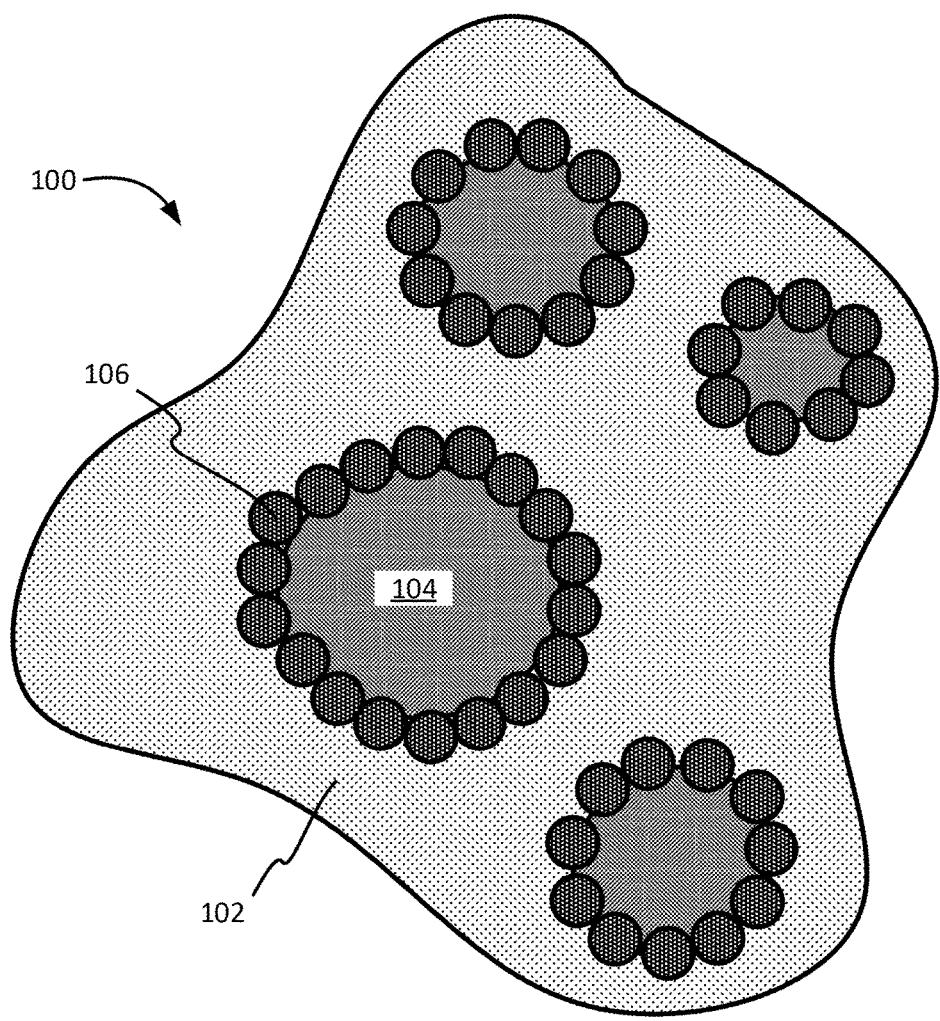
FIG. 1 is a schematic diagram illustrating an example acid-in-supercritical carbon dioxide emulsion.

This disclosure describes a supercritical carbon dioxide emulsified acid. For example, the supercritical carbon dioxide emulsified acid can be used a treatment fluid in a wellbore.

Hydrochloric acid (HCl) has been widely used to stimulate carbonate formation due to its low cost and high dissolving power. However, HCl has high corrosion rate and acid-rock reaction rate. High corrosion inhibitor concentrations can be used particularly at high temperatures to minimize the corrosion of downhole equipment which significantly increase the cost of acid treatments. Organic acids such as citric acid, formic acid, and acetic acid have low corrosivity and low acid-rock reaction rate compared to HCl. However, they are expensive and prone to calcium- and magnesium-based precipitation. Furthermore, in comparison to HCl, they have less dissolving power and do not react to completion under reservoir conditions. To retard the reaction rate between HCl and carbonate rock and achieve deep acid penetration, the HCl can be prepared as an emulsified acid, such as an acid-in-diesel emulsion. The acid-rock reaction retardation is due to the diesel external layer which acts as a barrier that provides corrosion protection and also minimizes the acid transfer to the rock surface. However, efficient formation penetration by acid-in-diesel emulsions is limited by the temperature of the downhole environment. At elevated temperatures (i.e., above 300° F.), the emulsion becomes unstable, and the external phase diesel no longer acts as an effective barrier, and thus the retardation mechanism is lost.

This disclosure describes the manufacture and use of an emulsion of acid-in-supercritical carbon dioxide ("supercritical $CO_2$" or "$scCO_2$"), including an internal phase of acid dispersed within an external phase of supercritical $CO_2$. Nanoparticles are used to stabilize the acid-in-supercritical $CO_2$ emulsion and enable the acid-in-supercritical $CO_2$ dioxide emulsion to withstand high temperatures. For example, at temperatures greater than 300° F., an acid-in-supercritical $CO_2$ emulsion is a more stable emulsion than an acid-in-diesel emulsion.

The acid-in-supercritical $CO_2$ emulsion described can be used to control stimulation of a subterranean formation in a wellbore, for example, during a fracturing operation. The emulsion can be flowed into the formation, for example, as a treatment fluid or stimulation fluid. As the external phase, the supercritical $CO_2$ acts as a barrier that decreases acid contact with downhole surfaces. The acid retardation is due to the supercritical $CO_2$ external layer in addition to the presence of gaseous $CO_2$ as a reaction product. Thus, the supercritical $CO_2$ provides significant corrosion protection from the acid. Furthermore, the supercritical $CO_2$ retards acid transfer to the surface of the formation of interest, allowing the acid to penetrate deeper into the formation. Thus, the stimulation is effective over a larger volume of the formation, potentially increasing extraction efficiency. As the acid-in-supercritical $CO_2$ emulsion has higher temperature tolerance, it can be used reliably in downhole environment conditions, including elevated temperature environments. The acid-in-supercritical $CO_2$ emulsion also enables rapid and effective clean up and liquid recovery after wellbore stimulation. For example, supercritical $CO_2$ in the emulsion can transition to a gaseous phase and be vented from the wellbore as gaseous $CO_2$. The $CO_2$ can also assist in lifting spent acid out of the wellbore.

FIG. 1 is a schematic diagram illustrating an example acid-in-supercritical carbon dioxide ("acid-in-$scCO_2$") emulsion 100. The example acid-in-$scCO_2$ emulsion includes an external phase of supercritical carbon dioxide 102. The supercritical $CO_2$ 102 is $CO_2$ at a sufficient temperature and a sufficient pressure to reach a supercritical state. For example, $CO_2$ simultaneously at temperatures greater than 40 C and at pressures greater than 1100 psi exists in a supercritical state. Droplets of acid 104 are the internal phase of the emulsion that are dispersed in the supercritical carbon dioxide 102. The outer surface of each droplet of acid 104 is surrounded by multiple nanoparticles 106. The nanoparticles 106 stabilize the emulsified acid 104 within the supercritical carbon dioxide 102 and allow the acid 104 to remain longer in the emulsified state. The acid 104 can be hydrochloric acid (HCl) or another acid such as citric acid, formic acid, acetic acid, hydrofluoric acid, or another acid. In some implementations, the acid 104 is a chelating agent (e.g., EDTA or another chelating agent) or another type of reactive fluid. In some implementations, one or more corrosion inhibitors are added to the acid 104 or to the emulsion 100. The corrosion inhibitors can help protect tubing and equipment from corrosion due to the acid 104. For example, a corrosion inhibitor can include acetaldehyde, methanol, surfactants, or other corrosion-inhibiting substances. The nanoparticles 106 can be silicon dioxide nanoparticles or any other suitable hydrophobic nanoparticles.

Figure 2:
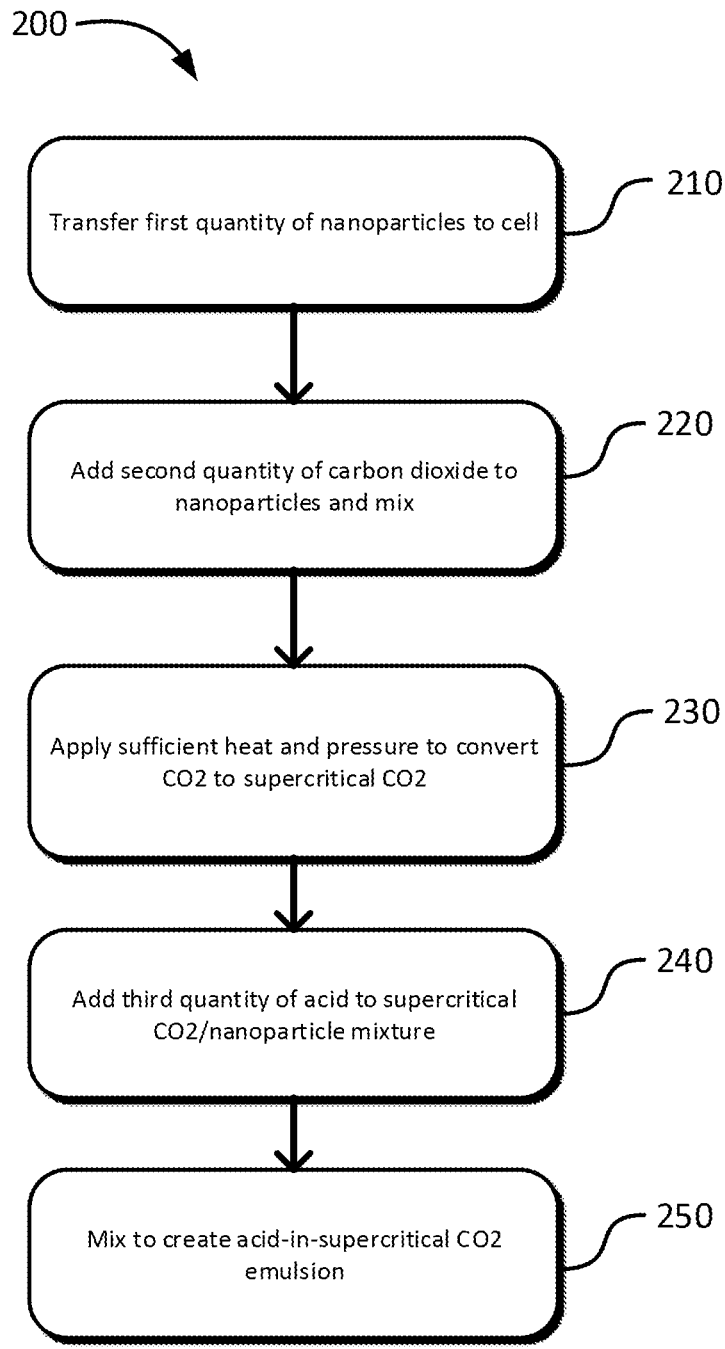
FIG. 2 is a flow chart showing an example process 200 for producing acid-in-supercritical carbon dioxide emulsion.

FIG. 2 is a flow chart showing an example process 200 for producing acid-in-$scCO_2$ emulsion. In some implementations, the process 200 may include additional or different operations, and the operations may be performed in the order shown in FIG. 2 or in another order. The process 200 can be repeated or the absolute amounts of materials increased or decreased to produce more or less product, respectively.

At 210, a first quantity of nanoparticles is transferred to a high-pressure and high-temperature cell. The cell can be a see-through cell, tank, chamber, or other volume capable of withstanding the temperature and pressure required to maintain $CO_2$ in a supercritical state. The nanoparticles can be hydrophobic nanoparticles as described previously. As an example implementation, 1 g of nanoparticles can be transferred to the cell. In other implementations, other amounts or concentrations of nanoparticles can be transferred to the cell as the first quantity. For example, the nanoparticles can be transferred at a concentration of 0.1% by weight to 10% by weight.

At 220, a second quantity of carbon dioxide is transferred to the cell and mixed with the nanoparticles. The $CO_2$ can be added in a solid state, a gaseous state, a liquid state, or a supercritical state. For example, the $CO_2$ can be pressurized above 1500 psi and thus be in a liquid state when transferred to the cell. For the example implementation, 30 ml of liquid $CO_2$ can be transferred to the cell and mixed with the 1 g of nanoparticles. In other implementations, other amounts of $CO_2$ can be transferred to the cell as the second quantity.

At 230, sufficient heat and pressure is applied to the $CO_2$-nanoparticle mixture to convert the $CO_2$ to supercritical $CO_2$. In some implementations, the sufficient temperature and pressure is achieved by heating the cell, which can increase the pressure of the $CO_2$ as the $CO_2$ is heated within the cell. In some implementations, the $CO_2$ is in a supercritical state when added to the cell, and the cell has a sufficient temperature and pressure to maintain the $CO_2$ in the supercritical state. In some implementations, the cell is at a sufficient temperature and pressure when $CO_2$ that is not in a supercritical state is transferred to the cell, and the $CO_2$ is converted to the supercritical state in the cell during or after being transferred to the cell. For example, the $CO_2$ can be pressurized when transferred to the cell, and the cell provides heat sufficient to convert the $CO_2$ to a supercritical state.

At 240, a third quantity of acid is added to the $scCO_2$-nanoparticle mixture in the cell while the cell maintains the $CO_2$ in the supercritical state. The acid can be HCl or another acid as described previously, or the acid can be a combination of acids. The acid can also be a diluted acid. The acid can be added at a certain rate to facilitate mixing, such as a drop-wise rate or other rate. In some implementations, the proportion of the concentration of the acid to the concentration of the supercritical $CO_2$ is in a range between 30% and 70%. In the example implementation, 70 ml of 15% HCl can be added to the 30 mL of $CO_2$ and the 1 g of nanoparticles. In other implementations, other amounts of acid can be transferred to the cell as the third quantity.

In some implementations, one or more corrosion inhibitors are mixed with the acid prior to the acid being added to the cell. In some implementations, the corrosion inhibitors are added to mixture of acid, $scCO_2$, and nanoparticles. In some implementations, the concentration of the corrosion inhibitor is in a range of between 0.25% and 0.6% by volume.

At 250, the acid-$scCO_2$-nanoparticle mixture is blended for a duration of time to obtain an acid-in-$scCO_2$ emulsion. The mixture can be blended in the cell and can be blended using a high shear mixer, a stirrer, an agitator, or another blending device. The mixture can be blended until an emulsion is formed. For example, in the example implementation, the mixture can be blended for a duration of time in the range of 10-15 minutes. Other durations of time may be used depending on the overall amount or composition of the mixture.

In some implementations, the stability of the acid-in-$scCO_2$ emulsion can be determined based, in part, on measuring the height of the emulsion. Over time, the acid in the emulsion can separate out of the emulsion, reducing the height of the emulsified portion relative to the height of the total emulsion mixture. The rate at which the acid separates out of the emulsion is indicative of the stability of the emulsion. A slower rate of acid separation can indicate a more stable emulsion, and a faster rate of acid separation can indicate a less stable emulsion. The height of the emulsified portion can be measured in response to mixing the nanoparticles, the supercritical $CO_2$, and the acid. Measuring the height of the emulsified portion in response to mixing can be, for example, measuring the height after mixing or measuring the height while mixing. The height of the emulsified portion can be measured periodically and compared with the height of the total emulsion mixture that includes the height of the separated acid. In this manner, the rate of acid separation and thus the stability of the emulsion can be determined. If the emulsion height measurement shows that the emulsion is insufficiently stable, the relative amounts of the nanoparticles, the supercritical $CO_2$, and the acid can be adjusted as necessary to improve stability.

Figure 3:
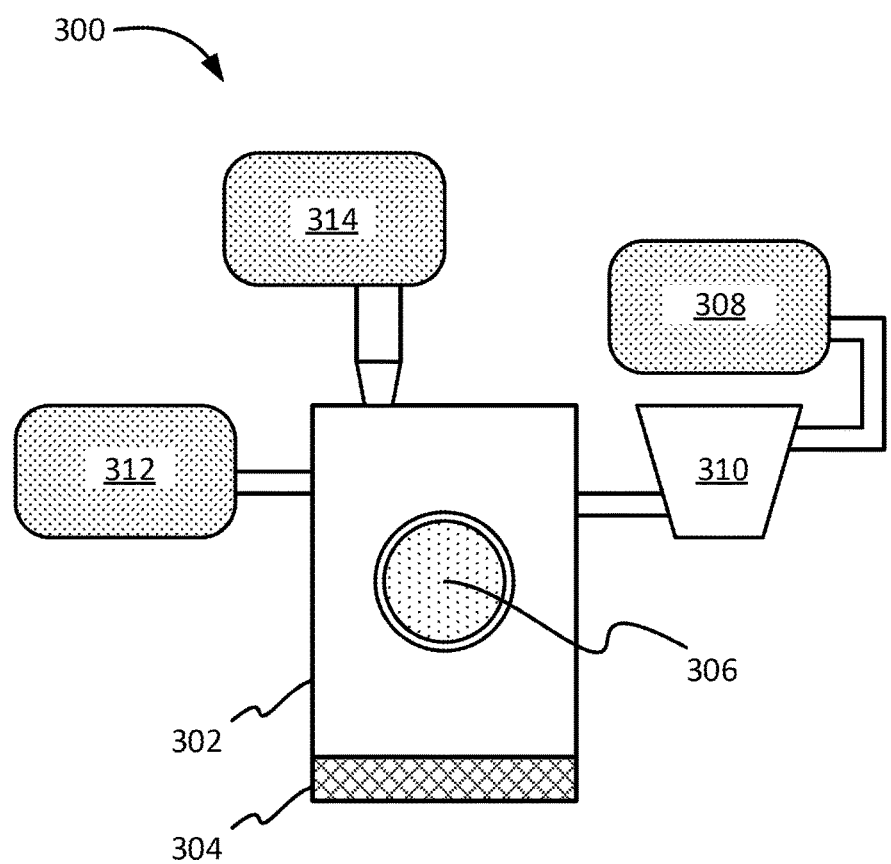
FIG. 3 is a schematic diagram of an example system to manufacture an acid-in-supercritical carbon dioxide emulsion.

FIG. 3 is a schematic diagram of an example system 300 to manufacture an acid-in-$scCO_2$ emulsion. The system 300 can, for example, implement some or all of process 200. System 300 includes a cell 302 that is connected to a $CO_2$ supply 308 and an acid supply 314. In some implementations, the cell 302 is connected to a nanoparticle supply 312, as shown in FIG. 3. The system 300 can include valves, piping, tubing, seals, fasteners, or other components that facilitate operation.

The cell 302 can be a tank, chamber, container, or other enclosed or sealed volume that can withstand temperatures and pressures sufficient for containing supercritical $CO_2$. For example, cell 302 can be a hollow metal cylinder. The cell 302 can be made of a metal such as aluminum or steel or other metal, or be made of another material. In some implementations, the cell 302 includes a blending device such as a high-shear mixer to mix the contents of the cell 302. In some implementations, the cell 302 includes a window 306. Window 306 is a transparent window that allows the interior of the cell 302 to be seen. For example, the window 306 can allow the emulsion to be observed, and the emulsion height to be seen and measured. The window 306 is able to withstand temperatures and pressures associated with supercritical $CO_2$ and can be made of glass, plastic, or another material.

The cell 302 can also include a heat source 304. The heat source 304 can be integrated into the cell 302 or be a separate component that is coupled to the cell 302. The heat source 304 provides the heat that heats or maintains the temperature of the $CO_2$ in the cell 302. The heat source 304 can be a resistive heat source, a radiative heat source, or some other type of heat source.

The $CO_2$ supply 308 supplies the $CO_2$ used in the emulsion. The $CO_2$ supply can be a tank, vessel, chamber, Dewar, or other volume. The $CO_2$ supply 308 can be integrated into the cell 302 (e.g., as an additional chamber) or be a separate component that is connected to the cell 302 (e.g., by piping). The $CO_2$ supply 308 can contain $CO_2$ in a solid, liquid, gaseous, or supercritical state. The $CO_2$ supply 308 can contain $CO_2$ in a pressurized state. In some implementations, the $CO_2$ supply supplies $CO_2$ to the cell 302 through a pressurizer 310. The pressurizer 310 can pressurize the $CO_2$ from the $CO_2$ supply 308 before the $CO_2$ is transferred to the cell 302. For example, the pressurizer 310 can receive gaseous $CO_2$ from the $CO_2$ supply and pressurize the gaseous $CO_2$ to convert it to liquid $CO_2$. The pressurizer 310 can be an accumulator, pump, or other type of pressurizing system.

The acid supply 314 can be a tank, vessel, chamber, or other volume that can supply acid to the cell 302. In some implementations, the acid supply 314 holds a specific quantity (i.e., a premeasured amount) of acid. The acid supply 314 can be integrated into the cell 302 (e.g., as an additional chamber) or be a separate component that is connected to the cell 302 (e.g., by piping). In some implementations, the acid supply 314 supplies acid to the cell 302 at a measured rate, such as a drop-wise rate.

The cell 302 can be connected to a nanoparticle supply 312 that supplies nanoparticles to the cell 302. The nanoparticle supply 312 can be a container, vessel, chamber, port, or other component that can supply nanoparticles to the cell 302. In some implementations, the nanoparticle supply 312 holds a specific quantity (i.e., a premeasured amount) of nanoparticles. The nanoparticle supply 312 can be integrated into the cell 302 (e.g., as an additional chamber) or be a separate component that is connected to the cell 302 (e.g., by piping). In some implementations, the nanoparticles are added to the cell 302 before the cell 302 is sealed, heated, or pressurized. In some implementations, the nanoparticles are introduced into the cell 302 through an airlock or other transfer chamber. In this manner, the nanoparticles can be transferred to the cell even if the cell is heated or pressurized.

Figure 4:
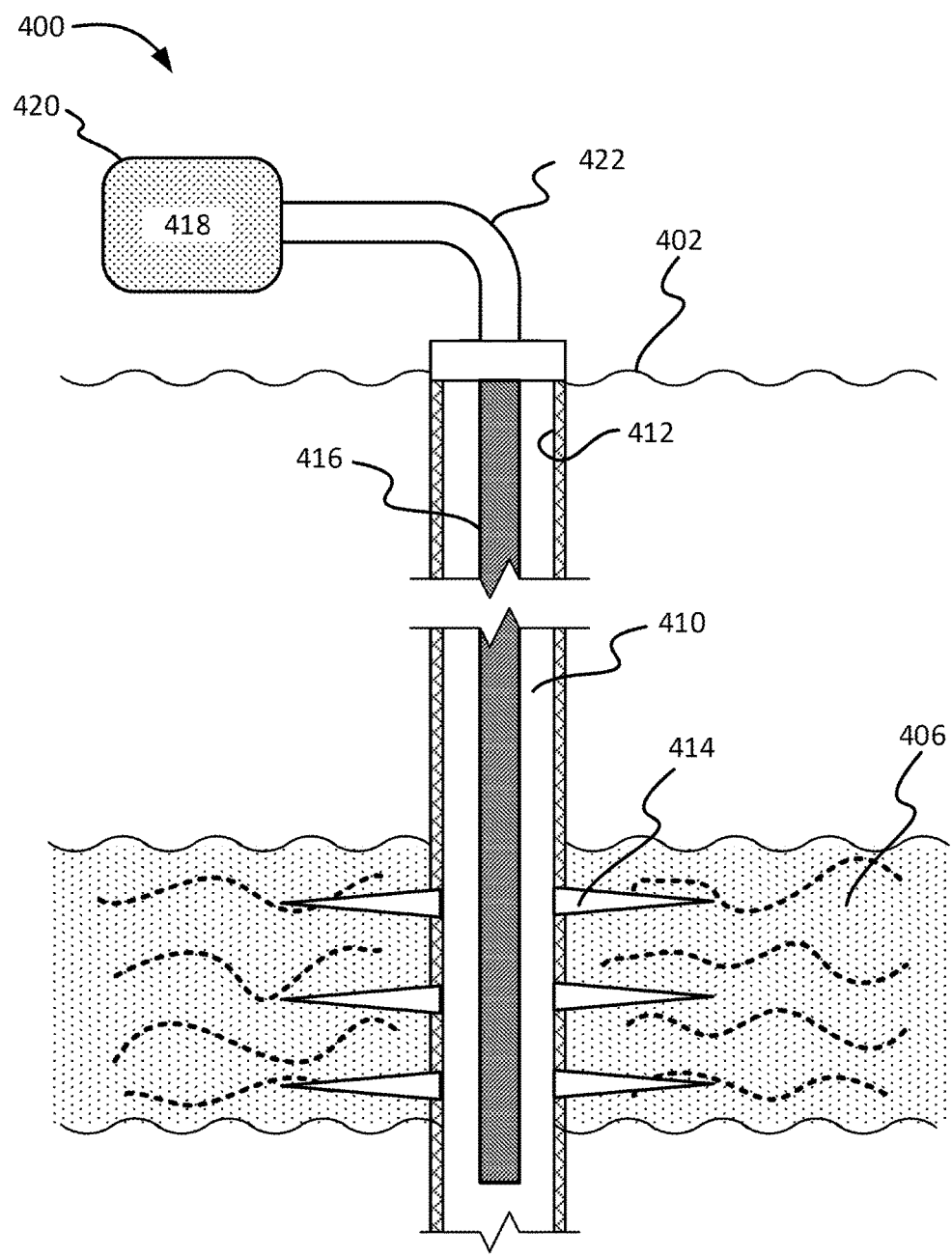
FIG. 4 is a diagram illustrating an example well system.

FIG. 4 is a diagram illustrating an example well system 400. The example well system 400 can implement some or all of process 200 to manufacture an acid-in-$scCO_2$ emulsion. The well system 400 can flow acid-in-$scCO_2$ emulsion 118 into a subterranean formation 406, as described below. The example well system 400 includes a wellbore 410 below the terranean surface 402. The example wellbore 410 is cased by a casing 412. A wellbore 410 can include any combination of horizontal, vertical, curved, and/or slanted sections.

The well system 400 includes a working string 416 that resides in the wellbore 410. The working string 416 terminates above the surface 402. The working string 416 can include a tubular conduit of jointed and/or coiled tubing configured to transfer materials into and/or out of the wellbore 410. The working string 416 can be in fluid communication with an emulsion supply 420 that supplies the acid-in-$scCO_2$ emulsion 418. The emulsion supply 420 supplies acid-in-$scCO_2$ emulsion 418 to the working string 416 via a transfer system 422 of conduits, pumps, piping, and other related equipment. The working string 416 can communicate a fluid such as the acid-in-$scCO_2$ emulsion 418 into or through a portion of the wellbore 410.

The casing 412 can include perforations 414 in a subterranean region or zone, and the acid-in-$scCO_2$ emulsion 418 can flow into a formation 406 through the perforations 414. The acid-in-$scCO_2$ emulsion 418 can be used to stimulate formation 406, as described previously. In instances where some or all of the wellbore 410 is left open in an "open hole configuration" coinciding with the formation 406, the acid-in-$scCO_2$ emulsion 418 can flow through the open hole wall of the wellbore 410. Additionally, resources (e.g., oil, gas, and/or others) and other materials (e.g., sand, water, and/or others) may be extracted from the formation 406. The casing 412 or the working string 416 can include a number of other systems and tools not illustrated in the figures.

In some instances, some or all of the example process 200 can be used to produce acid-in-scCO$_2$ emulsion 418 for use in the well system 400. The acid-in-scCO$_2$ emulsion 418 can be produced at the well system 400 site or produced off-site and transported to the well system 400 site. For example, some or all of process 200 can be implemented by emulsion supply 420 to produce the acid-in-scCO$_2$ emulsion 418. In some implementations, the acid-in-scCO$_2$ emulsion 418 can be produced in a system like system 300 shown in FIG. 3. In some instances, the supercritical CO$_2$ in the acid-in-scCO$_2$ emulsion 418 remains in a supercritical state once transported downhole. In some instances, CO$_2$ can be supplied downhole and the CO$_2$ be converted to supercritical CO$_2$ downhole. In this manner, the acid-in-scCO$_2$ emulsion 418 can be manufactured downhole.

In some implementations, the acid-in-scCO$_2$ emulsion can be formulated to control the stimulation of the formation. Based on the characteristics of the formation (e.g., size, porosity, composition, etc.), the composition of the acid-in-scCO$_2$ emulsion can be specified to obtain an identified acid retardation rate or rock reaction rate within the formation. For example, the quantity of CO$_2$ in the stimulant (e.g., the proportion of scCO$_2$ in an acid-in-scCO$_2$ emulsion) can be determined to obtain a specific acid retardation rate or rock reaction rate for an identified formation. For example, an acid-in-scCO$_2$ emulsion with a lower proportion of CO$_2$ has more acid available to react with the formation, and thus can have a lower acid retardation rate than an acid-in-scCO$_2$ emulsion with a higher proportion of CO$_2$. In some implementations, the CO$_2$ flowed into the formation is in a gaseous state or liquid state. CO$_2$ in a liquid or supercritical state has greater viscosity than CO$_2$ in a gaseous state, thus can increase the retardation rate of the acid in the formation. In some cases, the acid-in-scCO$_2$ emulsion has a rock reaction rate approximately 25% to 50% that of HCl.

A number of implementations have been described. Nevertheless, it will be understood that various modifications may be made without departing from the spirit and scope of the disclosure.

What is claimed is:

1. An emulsion comprising:
    an internal phase comprising acid;
    an external phase comprising supercritical carbon dioxide; and
    a plurality of nanoparticles to stabilize the internal phase and the external phase, wherein a ratio of a concentration of the acid to a concentration of the supercritical carbon dioxide is in a range between 30% and 70%, wherein the acid comprises hydrochloric acid.

2. The emulsion of claim 1, wherein the hydrochloric acid comprises 15% hydrochloric acid.

3. The emulsion of claim 1, wherein the nanoparticles comprise hydrophobic nanoparticles.

4. The emulsion of claim 1, wherein a concentration of nanoparticles in the emulsion comprises at least 0.1% by weight.

5. The emulsion of claim 1, further comprising a corrosion inhibitor.

6. The emulsion of claim 5, wherein a concentration of the corrosion inhibitor is in a range of between 0.25% and 0.6% by volume.

7. A method comprising:
    identifying a rate of acid retardation in a formation;
    determining a quantity of supercritical carbon dioxide to be included in a stimulant to obtain the identified rate of acid retardation in the formation;
    mixing a first quantity of nanoparticles and a second quantity of carbon dioxide; and
    mixing a third quantity of acid with the mixture of the first quantity and the second quantity at a temperature and a pressure sufficient to convert the carbon dioxide into the determined quantity of supercritical carbon dioxide.

8. The method of claim 7, further comprising mixing a fourth quantity of corrosion inhibitors with the first quantity, the second quantity, and the third quantity.

9. The method of claim 7, wherein mixing the third quantity of the acid to the mixture of the first quantity and the second quantity comprises mixing the third quantity at a drop-wise rate.

10. The method of claim 7, wherein mixing the first quantity, the second quantity, and the third quantity comprises mixing the first quantity, the second quantity, and the third quantity for a duration between about ten minutes and about fifteen minutes.

11. The method of claim 7, wherein the temperature is at least 40 C and the pressure is at least 1100 psi.

12. The method of claim 7, further comprising:
    measuring an emulsion height in response to mixing the third quantity with the mixture of the first quantity and the second quantity; and
    determining a stability of the emulsion based, in part, on the measured emulsion height.

13. The method of claim 12, wherein determining the stability of the emulsion based, in part, on the measured emulsion height comprises comparing the measured emulsion height with a total emulsion height.

14. The method of claim 7, further comprising pressurizing the second quantity of carbon dioxide before mixing the first quantity and the second quantity.

15. The method of claim 14, wherein pressurizing the second quantity of carbon dioxide comprises pressurizing the second quantity of carbon dioxide to at least 1500 psi.

16. The method of claim 7, wherein the acid comprises hydrochloric acid and the nanoparticles comprise hydrophobic nanoparticles.

17. A method for controlling formation stimulation, the method comprising:
    identifying a rate of acid retardation in a formation;
    determining a quantity of supercritical carbon dioxide to be included in a stimulant to obtain the identified rate of acid retardation in the formation; and
    manufacturing an emulsion comprising:
        an internal phase comprising a first quantity of acid;
        an external phase comprising the determined quantity of supercritical carbon dioxide; and
        a second quantity of a plurality of nanoparticles to stabilize the internal phase and the external phase.

18. The method of claim 17, further comprising flowing the emulsion into the formation.

* * * * *